3,091,270
ENGLISH MUFFIN SPLITTER
Frederick W. Sampson, Kettering, Ohio
(1300 Springhill Ave., Dayton 19, Ohio)
Filed Sept. 7, 1961, Ser. No. 136,533
7 Claims. (Cl. 146—203)

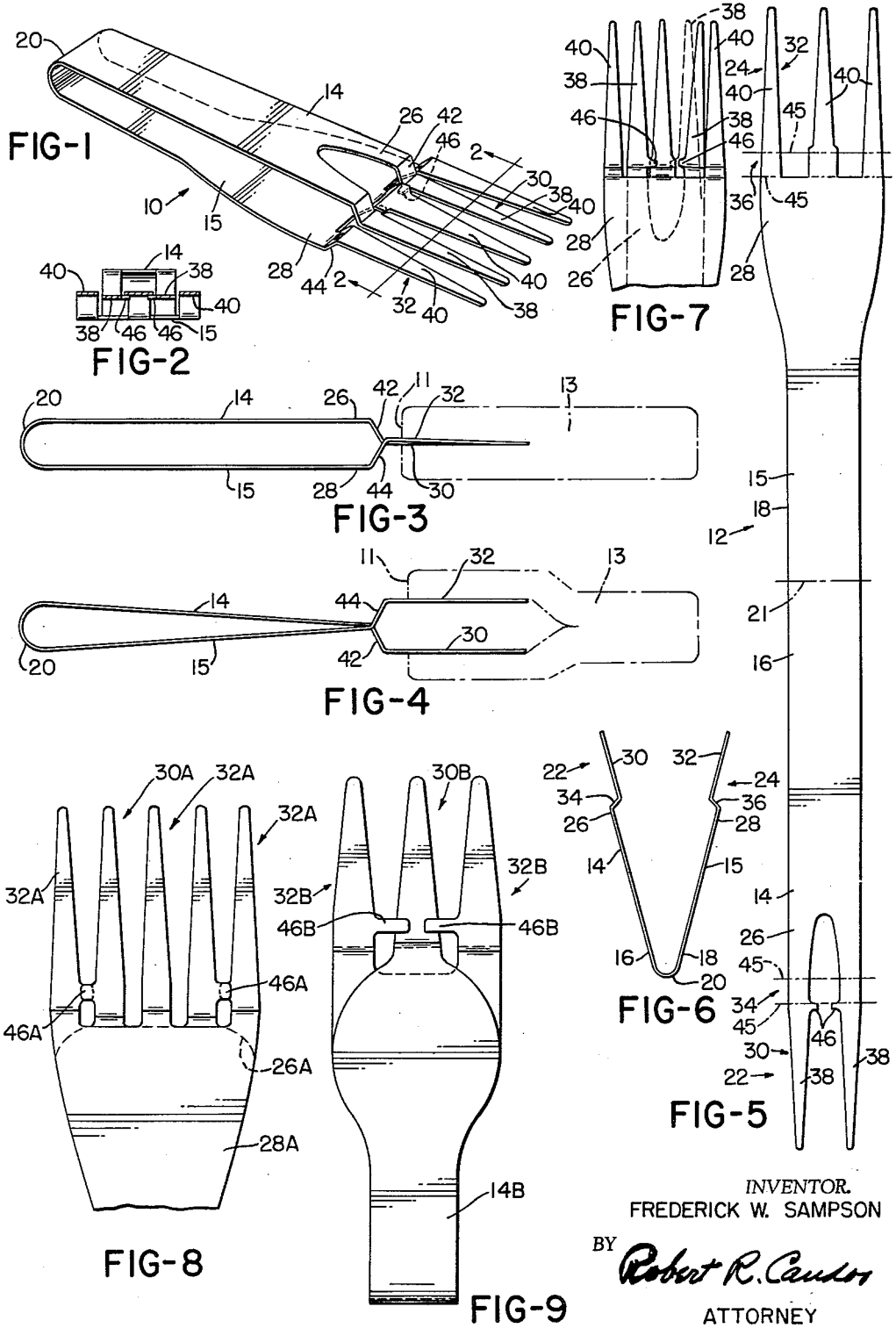

This invention is directed to a splitter for English muffins and the like.

The splitter of this invention provides a simple and efficient construction which easily splits the muffin in two halves, easily by a tearing action, as intended, rather than by a slicing action.

Heretofore English muffins and the like have been split by various means, which have been relatively unsatisfactory. For example, such muffins have been split by the use of the fingers of the hand, but this has been unsatisfactory and unsanitary. English muffins have also been sliced, but the slicing action spoils the dough-like construction of the muffins prior to the toasting action which follows.

According to this invention, a splitter is provided which has a plurality of flat splitting tines which are substantially aligned, from a sidewise view position. The splitter is inserted into the edge of the muffin while the tines are in this aligned condition, and then these tines are moved to a substantially parallel spread-apart relationship, from a sidewise view position, to produce the tearing action.

In a preferred embodiment, flexibility is designed into the tines and into the end construction of the handle farthest from the tines. The remainder of the handle is relatively inflexible. Flexibility is also designed into the portions at front ends of the tines, while the portions of the tines adjacent the handles are made relatively inflexible. These features cause the splitting force to be at a maximum near the base of the tines, which location is at the edge of the muffin, so when the tines are spread apart the muffin starts splitting at the edge and progressing toward the center of the muffin.

The tines, in sidewise aligned condition, are inserted at the approximate center of the edge of the muffin and then the handles are pressed together, to cause the tines to be spread apart. This action starts tearing of the two halves of the muffin apart. The splitter is then withdrawn and re-inserted in an unsplit portion of the edge of the muffin and the splitting action is repeated. This procedure is repeated a few times, working around the edge of the muffin, until the two halves are separated in an efficient and sanitary manner.

The splitter may be formed from a single piece of sheet material, such as sheet metal or the like, in an efficient, workmanlike, and economical manner.

Accordingly, it is an object of this invention to provide a splitter having one or more of the features herein disclosed.

Other objects become apparent from this description and the accompanying drawings, in which:

FIGURE 1 is a perspective view of a splitter embodying this invention.

FIGURE 2 is a cross section taken along the line 2—2 of FIGURE 1.

FIGURE 3 is a side view of the splitter, with the tines in substantially sidewise aligned condition, and with the tines inserted in the edge of a muffin.

FIGURE 4 is a view similar to FIGURE 3, showing the handles having been pressed together and the tines having been spread apart, to tear the edge of the muffin.

FIGURE 5 is a plan view of a blank which has been cut or stamped from a sheet of material, such as a metal sheet, and prior to any bending of the blank.

FIGURE 6 is a side view of the blank of FIGURE 5, with the blank having been bent at the center line, and prior to the interlocking of the tines.

FIGURE 7 is an upward view of a portion of FIGURE 1.

FIGURE 8 is an enlarged view somewhat similar to FIGURE 7 and showing another embodiment.

FIGURE 9 is an enlarged view somewhat similar to FIGURE 7 and showing another embodiment.

Referring first to FIGURES 1 through 7, a splitter 10, according to this invention, may be made so the tines of the splitter, in aligned condition, may be inserted into the edge 11 of the muffin 13, as shown in FIGURE 3, and then these tines may be spread apart to tear a portion of the edge of the muffin, as shown in FIGURE 4.

The splitter 10 and the like may, if desired, be efficiently, neatly and economically formed from a single piece of sheet material 12, FIGURE 5, which is a flat blank which may be cut or stamped from sheet material, such as sheet metal material of the desired firmness and flexibility to accomplish the functions of the splitter which are herein described. The final product is made substantially without any of the usual assembly procedures.

The flat blank 12 may be initially bent to form the two outwardly sprung diverging handles 14 and 15, as shown in FIGURE 6, which may be relatively flat and which may be integrally joined at their rear ends 16 and 18 by a curved, U-shaped spring construction or bend 20. The center line of the bend is indicated at 21 in FIGURE 5. The handles 14 and 15 may have integral tine constructions 22 and 24 at their front ends 26 and 28 respectively.

Each tine construction, such as 22 and/or 24, may have one or more tines 30 and 32 respectively. The tines have main bodies 38 and 40 which are relatively flat, and, in the final form, extend in a direction substantially parallel to the handles 14 and 15 respectively.

The tines may be relatively wide toward their rear ends and relatively narrow toward their front ends. This imparts relative flexibility to the front ends of the tines and relative inflexibility to the rear ends of the tines. This causes the tines to tear the edge 11 of the muffin first with a progressing tearing action toward the center of the muffin, in a desirable manner.

The tines 30 and 32 have inter-crossing constructions 34 and 36 respectively. These inter-crossing constructions are between the front ends of the handles 14 and 15 and the main bodies of the tines, which main bodies are indicated by the reference numerals 38 and 40 respectively.

The handles 14 and 15 are relatively inflexible adjacent their front ends 26 and 28 respectively, and this is accomplished by providing sufficient width to the material which makes the handles 14 and 15. These handles are relatively flexible adjacent their rear ends 16 and 18, and this is accomplished by a combination of the width of the material making the handles and also by the proximity of the rear ends 16 and 18 to the U-bend 20 which makes it possible to flex the handles 14 and 15 at their rear ends 16 and 18 by the leverage provided, since it is generally the front ends 26 and 28 which are subjected to the pressing action of the user's hand.

The inter-crossing constructions 34 and 36 may be produced by providing transversely directed bends 42 and 44 respectively at the rear ends of the tines 38 and 40. These bends 42 and 44 join the front ends of the handles 14 and 15, near the front ends 26 and 28 respectively. The bend lines for the bends 42 and 44 are indicated at 45 in FIGURE 5.

Means may be provided normally to limit the outward movement of the handles 14 and 15 when they are released for outwardly sprung action, which is caused by the spring 20 and the adjacent end portions of the handles. Such means may take the form of one or more sidewise tongues 46 on one or more tines 38 (or 40) which tongues 46 engage one or more other tines 40 (or 38) to form such means to limit the outward movement of the handles.

These tongues 46 are not normally movable past the other tines which they engage. However, by sidewise movement of the handles and of the tines these tongues 46 may be caused to pass the normally engaged tine, so that the tine constructions may be locked together for normal use, or may be unlocked, to allow the handles 14 and 15 to spread apart as shown in FIGURE 6.

The tines 30 and 32 are made to alternate, or be dovetailed, when viewed from the top or bottom of the splitter as in FIGURES 1, 7, 8 and 9, so they may pass each other when they are being folded from the position of FIGURE 6 to the position of FIGURE 1. The tongue or tongues 46 may be pressed past the engaged tine by sidewise motion heretofore described. This simple procedure is the only "assembly" required to produce the splitter in final form.

FIGURE 8 shows a splitter construction which may be substantially identical with that shown in FIGURES 1 to 7. However, the sidewise tongues 46A on the tines 30A are directly outwardly, to engage the outermost tines 32A instead of the central tines 32A, which was the method used in FIGURES 1 through 7. If desired the outermost tines 32A may be provided with inwardly directed sidewise tongues corresponding to tongues 46A, as shown in dotted lines in FIGURE 8. The handle ends 28A and 26A, of FIGURE 8, are shown to be substantially identical in width practically up to the point where the handles join the tines, as distinguished from the construction in FIGURES 1 through 7, in which the handle 14 is not increased in size adjacent the tines.

FIGURE 9 shows a construction in which one handle 14B has a tine construction with a single tine 30B and the handle which corresponds to the handle 15 of FIGURES 1–7, and which is covered by the handle 14b in FIGURE 9, is provided with two tines 32B. In this construction, sidewise tongues 46B are formed on the tines 32B instead of the single tine 30B.

It is to be noted that the method of operation of the embodiments of FIGURES 8 and 9 may be substantially the same as that of the embodiments of FIGURES 1 through 7. In all of the embodiments, the tine constructions may be used to open the edge 11 of the muffin 13, as previously described.

It is to be noted that the tine constructions, such as 30 and 32 are substantially in aligned condition, as viewed sidewise, when the handles 14 and 15 are in their normal outward limit, such as shown in FIGURE 3. If desired, a very small wedge deviation may be provided in the tine constructions, as indicated in FIGURE 3, which is nevertheless substantially an aligned condition, which provides a small wedging action when the tines are inserted into the edge of the muffin 13. When the handles 14 and 15 are pressed together, to their completely pressed condition, then the tines 30 and 32 assume a substantially parallel condition from a sidewise point of view, such as is shown in FIGURE 4. This is of great advantage, since the parallel relationship of the tines 30 and 32 is maintained substantially from the time that the tines are inserted into the muffin, as indicated in FIGURE 3, to the time when the tines reach their maximum spread apart condition, such as shown in FIGURE 4. This provides a very satisfactory tearing action. This spreading action may be repeated along the periphery of the edge 11 around the muffin.

The relatively flat construction of the tines produces a desirable tearing action.

The splitter lends itself to many advantages in manufacture and merchandising.

The flat blank, such as shown in FIGURE 5, may be produced by relatively efficient and simple press operation. The blank may be marketed as an article of manufacture. A plurality of these blanks may be readily stacked for transportation to the purchaser.

The blank, such as shown in FIGURE 5, may be bent into an article having a shape such as shown in FIGURE 6. Such article also may be marketed as an article of manufacture. A plurality of these blanks may also be readily stacked for transportation to the purchaser.

The article such as shown in FIGURE 6 may be made into a splitter such as shown in FIGURE 1. This step involves merely pressing the handles 14 and 15 toward each other with the tines 30 and 32 in a dovetail type of relationship so that the tine construction 22 of one handle is caused to pass, in dovetail relationship, the tine construction 24 of the other handle. While this procedure progresses, the handles and tines are given a sidewise motion, back and forth, to permit the tongue or tongues 46 to pass the adjacent tine to produce the locking relationship heretofore described.

Hence a blank 12, such as shown in FIGURE 5, an article such as shown in FIGURE 6, a splitter, such as shown in FIGURE 1, and a simple and effective method or methods of making these members have been provided by this invention.

In use, the splitter 10 is inserted into the edge 11 of the muffin 13 while in the condition of FIGURE 3, with the handles 14 and 15 spread apart by their spring action, and with the tines 30 and 32 in substantially aligned condition, from a sidewise point of view. Thereafter the handles 14 and 15 are pressed together as shown in FIGURE 4 to cause the tines 30 and 32 to move apart in a substantially parallel condition, as viewed from the side. This produces an effective and desirable tearing action which may be successively repeated around the edge of the muffin as many times as desired.

While the form of the invention now preferred has been disclosed as required by the statutes, other forms may be used, all coming within the scope of the claims which follow.

What is claimed is:

1. A splitter and the like comprising a single piece of sheet material which forms two outwardly sprung relatively flat handles integrally joined at their rear ends by a U-shaped spring construction and each handle having an integral tine construction at the front end of said handle, said tine constructions each having at least one main tine body which is relatively flat, and extend in a direction substantially parallel to its respective handle, said main tine bodies having intercrossing constructions between the front ends of said handles and said main tine bodies, one of said tine constructions having at least two of said main tine bodies, in which one of said main tine bodies is dovetailed between two of said main tine bodies.

2. A splitter and the like comprising a single piece of sheet material which forms two outwardly sprung relatively flat handles integrally joined at their rear ends by a U-shaped spring construction and each handle having an integral tine construction at the front end of said handle, said tine constructions each having at least one main tine body which is relatively flat, and extend in a direction substantially parallel to its respective handle, said main tine bodies having intercrossing constructions between the front ends of said handles and said main tine bodies, one of said tine constructions having at least two of said main tine bodies, in which one of said tine constructions has three of said main tine bodies and the other of said tine constructions has two of said main tine bodies dovetailed between said three of said tine bodies.

3. A splitter and the like comprising a single piece of sheet material which forms two outwardly sprung relatively flat handles integrally joined at their rear ends by a U-shaped spring construction and each handle having an integral tine construction at the front end of said handle, said tine constructions each having at least one main tine body which is relatively flat, and extend in a direction substantially parallel to its respective handle, said main tine bodies having intercrossing constructions between the front ends of said handles and said main tine bodies, one of said tine constructions having at least two of said main tine bodies, in which one of said tine constructions has a plurality of said main tine bodies and the other of said tine constructions has a plurality of tine bodies, and in which certain of said tine bodies on said one of said tine constructions are dovetailed between certain of the said tine bodies on said other of said tine constructions.

4. A splitter and the like comprising a single piece of sheet material which forms two outwardly sprung relatively flat handles integrally joined at their rear ends by a U-shaped spring construction and each handle having an integral tine construction at the front end of said handle, said tine constructions each having at least one main tine body which is relatively flat, and extend in a direction substantially parallel to its respective handle, said main tine bodies having intercrossing constructions between the front ends of said handles and said main tine bodies, one of said tine constructions having at least two of said main tine bodies, in which tongue means on one of said tine bodies is provided normally to limit the outward movement of said handles, and which has means to cause said tine bodies to be in substantial sidewise alignment when said handles are at their limit of outward movement for insertion into a muffin and the like, and to cause substantially sidewise parallel relationship when said handles are pressed together to tear apart portions of said muffin and the like.

5. A splitter and the like comprising: two outwardly sprung flat handles hingedly joined together at their rear end, one of said handles having at least one tine and the other of said handles having a plurality of tines, said tines having intercrossing tine portions near their rear ends, said tines having substantially flat tine portions between said intercrossing tine portions and the free ends of said tines, said splitter having means to cause said flat tine portions to be substantially parallel and spread apart sidewise when said handles are pressed together and to be substantially aligned sidewise when said handles are not pressed together.

6. A splitter and the like made by bending a flat blank of sheet material having aligned oppositely directed handle forming portions joined by a spring forming portion, said handle forming portions being joined to respective oppositely directed tine formations which have tines which are dovetailed with one tine on one handle portion passing between two tines on the other handle portion when said handle forming portions are bent toward each other.

7. A splitter and the like according to claim 6 in which the blank from which said splitter is made has a tongue on one of said tines which engages another tine in locking relationship when said handles are folded toward each other.

References Cited in the file of this patent
UNITED STATES PATENTS

| | | |
|---|---|---|
| 58,665 | Mix | Oct. 9, 1866 |
| 411,797 | Farrell | Oct. 1, 1889 |
| 528,257 | Murray | Oct. 30, 1894 |
| 574,476 | Coy | Jan. 5, 1897 |
| 674,741 | Patterson | May 21, 1901 |
| 1,622,309 | De Forest | Mar. 29, 1927 |
| 1,728,192 | Wellington | Sept. 17, 1929 |
| 1,979,748 | Kimmel | Nov. 6, 1934 |
| 2,818,097 | Glanz | Dec. 31, 1957 |
| 2,840,129 | Jovis | June 24, 1958 |

FOREIGN PATENTS

| | | |
|---|---|---|
| 466,117 | France | Feb. 21, 1914 |
| 339,204 | Great Britain | Dec. 4, 1930 |
| 95,690 | Sweden | Mar. 16, 1939 |